(No Model.)
W. IRVING.
SUPPORT FOR VEHICLE SHAFTS.
No. 522,420. Patented July 3, 1894.
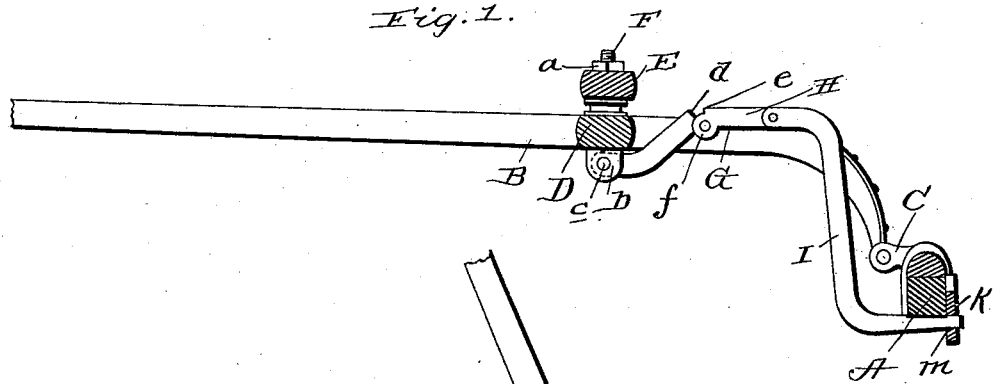
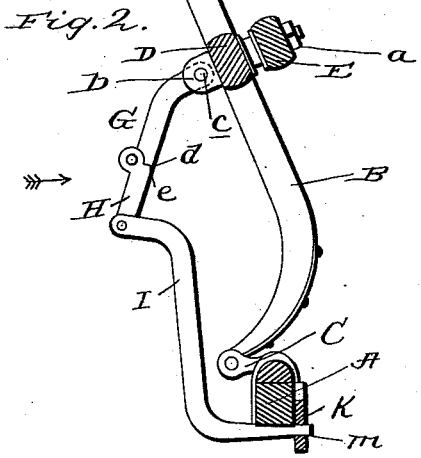
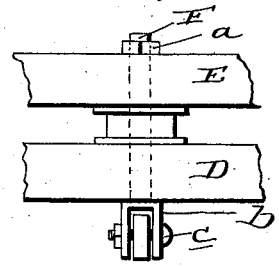
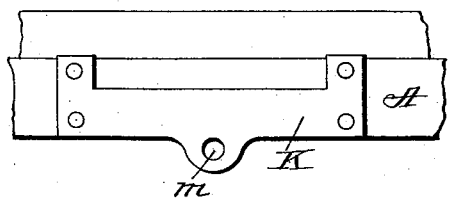
Witnesses:
Inventor
Whitmore Irving
By Jas. J. Sheehy
Attorney
THE NORRIS PETERS CO., PHOTO-LITHO., WASHINGTON, D. C.

United States Patent Office.

WHITMORE IRVING, OF MONCTON, CANADA, ASSIGNOR TO CHIPMAN A. STEEVES, OF SAME PLACE.

SUPPORT FOR VEHICLE-SHAFTS.

SPECIFICATION forming part of Letters Patent No. 522,420, dated July 3, 1894.

Application filed October 17, 1893. Serial No. 488,437. (No model.)

*To all whom it may concern:*

Be it known that I, WHITMORE IRVING, a subject of the Queen of Great Britain, residing at Moncton, in the Province of New Brunswick, Canada, have invented certain new and useful Improvements in Vehicle-Shaft Supports; and I do declare the following to be a full, clear, and exact description of the invention, such as will enable others skilled in the art to which it appertains to make and use the same.

My invention relates to improvements in vehicle shaft supports; and it has for its general object to provide a cheap, simple and light support, and one embodying such a construction that it may be applied to shafts such as at present in use without altering the construction thereof, and without the employment of skilled labor.

Other objects and advantages of the invention will be fully understood from the following description and claim when taken in connection with the annexed drawings in which—

Figure 1, is a detail, sectional view illustrating my improvements as applied to a pair of shafts, with the shafts in their normal operative position. Fig. 2, is a similar view with the shafts supported in their raised position. Fig. 3, is a detail enlarged elevation illustrating the pin or bolt through the medium of which the support is connected to the cross bar of the shafts, and Fig. 4, is a similar view showing the cleat for connecting the bracket arm of the support to the axle.

Referring by letter to said drawings: A, indicates the front axle of a vehicle; B, indicates the shafts or thills which are connected to the axle by couplings C, or in any other approved manner.

D, indicates the cross bar connecting the shafts or thills.

E, indicates the whiffle tree which is mounted on the cross bar; and F, indicates the bolt which serves to connect the whiffle tree to the cross bar and also serves as a pivot post for said whiffle-tree so as to permit of a free swinging movement of the same. This bolt F, may be secured in position by heading its upper end or providing it with a securing nut as *a;* and it is provided at its lower end (see Fig. 3), with a fork *b*, designed and adapted to receive one end of the hinge G, of the support which is pivotally connected to the fork through the medium of a bolt *c*. The said hinge member G, has its opposite end squared as illustrated at *d*, so as to engage the square end *e*, of the member H, when the parts are in the position shown in Fig. 2, and it is pivotally connected to an ear *f*, of said member H, as shown so as not to interfere with a free movement of the shafts when they are in their operative position.

I, indicates the bracket arm of the support which serves for the pivotal connection of the hinge member H, as shown, and also serves to support the hinge members and the shafts in the elevated position shown in Fig. 2. The said bracket arm I, may be rigidly connected to the axle A, in any approved manner, but I prefer in practice when possible to effect such connection through the medium of the cleat K, which is fixedly connected to the axle and is provided with an eye *m*, to receive the end of the arm, as shown.

In the practice of the invention, when it is desired to support the shafts in the elevated position shown in Fig. 2, it is simply necessary to raise them to such position and press the joint between the hinge members G, H, until said members rest in alignment as shown. When it is desired to lower the shafts, it is simply necessary to press the joint between the members G, H, in the direction indicated by arrow, when the shafts will fall.

It will be noticed, by reference to the drawings that my improved support is very simple and that it may be manufactured and applied to vehicles without materially increasing the cost or adding to the weight thereof.

It will be noticed that my improvements may be applied to vehicles such as at present in use, without altering the construction thereof; it being simply necessary to remove the bolt ordinarily employed for connecting the whiffletree to the cross bar of the shafts and substitute my improved bolt F, and connect the cleat K, to the axle in the manner before described. This may be accomplished without the employment of skilled labor, and it will therefore be perceived that the improvements may be applied to vehicles by the owners thereof at a very slight cost.

In addition to the advantages before pointed out, it will be seen that by reason of the employment of a single bolt F, for connecting the whiffle tree and the hinge member G, to the cross bar D, the objectionable necessity of boring a number of holes in said bar or in other parts of the shafts which tend to weaken the same, is obviated.

I am well aware that it is old as shown in the patent of one A. Angus, No. 377,922, to provide a thill support embodying a bracket arm fixedly connected to an axle, a hinge member pivotally connected at one end to the bracket arm and having its opposite end squared and provided with an ear, and a second hinge member having one of its ends squared and pivotally connected to the ear of the first named member and its opposite end pivotally connected with a bracket plate connected to a thill iron. I am also aware that it is old as shown in the patent of N. A. Vedder to connect a thill support at one end to an axle at a point midway the length thereof and at its opposite end to a plate connected to the cross bar of the thills; and I therefore make no claim to such constructions, but

What I claim, and desire to secure by Letters Patent, is—

The bolt F, connecting the whiffletree to the cross bar of the thills so as to take the place of the ordinary pivot bolt and having its lower end headed and forked, the cleat K, secured to the under side and central portion of the axle and the support arranged centrally between the shafts and comprising the member I, having its body portion straight and its ends turned approximately at right angles thereto and in opposite directions so as to present no obstruction to the hind feet of the animal when the thills are let down, the member G, curved as shown with the angular end e, and pivoted at its forward end in the fork of the bolt, and the short link or intermediate member H, connecting the forward end of the member I, with the rear end of the member G, and also having an angular portion d, all combined and adapted to operate, substantially as shown and described.

Moncton, New Brunswick, September 13, A. D. 1893.

WHITMORE IRVING.

Witnesses:
R. B. SMITH,
JAMES KAY.